Patented Feb. 23, 1954

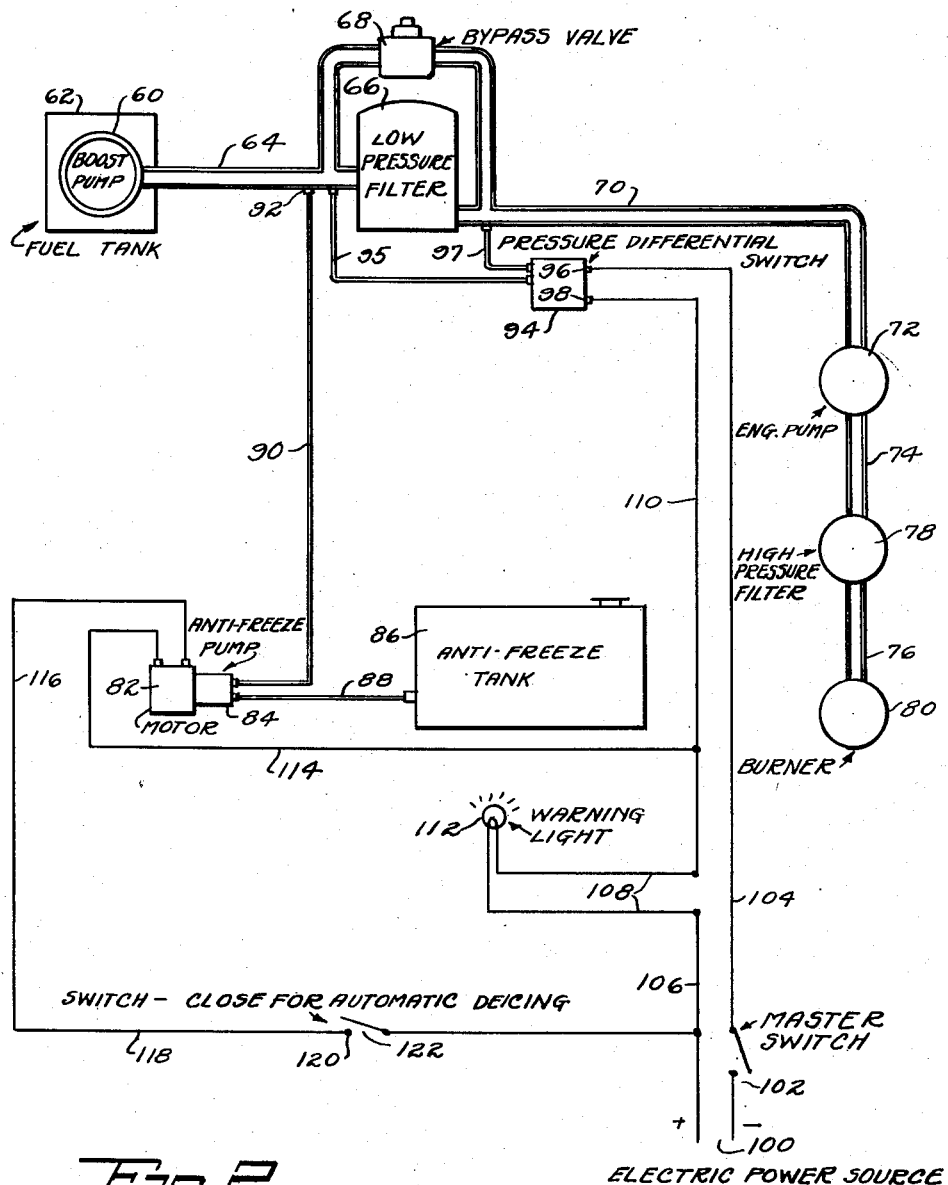

2,670,082

UNITED STATES PATENT OFFICE 2,670,082

ALCOHOL INJECTION SYSTEM FOR DEICING AIRCRAFT FUEL FILTERS AND STRAINERS

Robert G. Dunn, Dayton, Ohio, and Robert F. Heiser, Valparaiso, Fla.

Application November 23, 1949, Serial No. 129,163

6 Claims. (Cl. 210—150)

(Granted under Title 35, U. S. Code (1952), sec. 266)

The invention described herein may be manufactured and used by or for the United States Government for governmental purposes without payment to us of any royalty thereon.

This invention is closely related to our copending application Serial No. 115,755, now Patent Number 2,623,638, and pertains to a device for preventing the icing of filters and/or filter screens normally employed in the fuel line of an aircraft fuel system.

The spraying of an antifreeze into the air chute or the carburetor intake of an aircraft engine to prevent undesirable ice formation in the carburetor air intake is old in the art as was pointed out in our copending application. In carburetor de-icing the evaporation of the liquid fuel spray causes a drop in the temperature of the intake air and, under certain conditions of temperature and humidity, the moisture in the air which is being drawn in is precipitated and deposited in the air passageway in the form of ice tending to restrict normal air flow through the carburetor.

Through extended experiments with this subject, however, applicants were convinced that engine failure was less often due to restriction of the air induction line due to icing of the air chute or carburetor intake from condensation of moisture present in the air being inducted than to the icing up of one or more filters or filter screens in the fuel line where substantially no air is present from which water would be expected to be precipitated.

It is known, however, that after all of the free water content has been segregated and removed from a quantity of fuel, a small amount of water is retained in the fuel in solution, the amount depending on the temperature, i. e., as the temperature of the fuel is lowered, its capacity to retain water in solution is reduced, and the fuel will acquire a higher free water content. Apparently the water which is held in solution and which is forced out of solution as the temperature is lowered, freezes, forming minute ice particles which remain suspended for indefinite periods and which will ice up a screen of much larger openings than the particles themselves.

It has heretofore been suggested to add a percentage of antifreeze, preferably alcohol, in bulk to the fuel supply to prevent icing in the fuel line. This expedient, however, seems only to aggravate the difficulty for the reason that alcohol-fuel mixtures are capable of holding larger quantities of water in solution at any given temperature than the fuel alone, so that if the temperature of the fuel drops, due to a rapid rise in altitude, or for any other reason, the fuel will give up more of the water which is being held in solution with the result that there will now be more free water from which ice particles may be formed to clog up the filters or screens than would have been the case with the fuel alone. Moreover, it is wasteful of antifreeze to infuse an entire tank of fuel when the entire tank may be consumed without encountering any freezing conditions.

As a solution of the above adverse conditions we have provided a device whereby, when icing conditions prevail, a liquid antifreeze may be injected by means of an antifreeze pump into the fuel line at the upstream side of the low pressure filter where it may mix with the fuel and pass therewith as a fuel-antifreeze mixture through the several filters or filter screens en route to the engine, thereby to forestall icing up of the several filters or filter screens through which it passes with a minimum use of antifreeze.

Additionally our invention includes means for sensing and indicating the pressure difference in the fuel line between the upstream and the downstream sides of the low pressure filter, whereby the navigator may know whether and to what extent icing is taking place. In its simplest form the pressure difference indicating means may consist of two pressure gauges connected in the fuel line, one upstream and the other downstream of the low pressure filter, or, it may comprise a single electric switch arranged to be actuated by the difference in pressure between the upstream and the downstream sides of the filter to light a signal light when icing becomes acute, or, the same said electric switch may, at a predetermined pressure difference between the upstream and downstream sides of the filter, convey electric current to the motor of the antifreeze pump whereby de-icing becomes completely automatic. A bypass around the low pressure filter may be provided and arranged to become operative if and when the deicing system fails to function.

The main object of the invention is to provide a device of the character described which is of simple construction and low cost yet highly effective for carrying out its intended purpose.

Other objects and advantages will be evident upon consideration of the following detailed description, reference being had to the drawing, wherein:

Fig. 2 is a view similar to Fig. 1 but with additional means to render the deicing equipment completely automatic in its operation when so desired.

Like reference characters refer to like parts throughout the several views.

Figure 1:
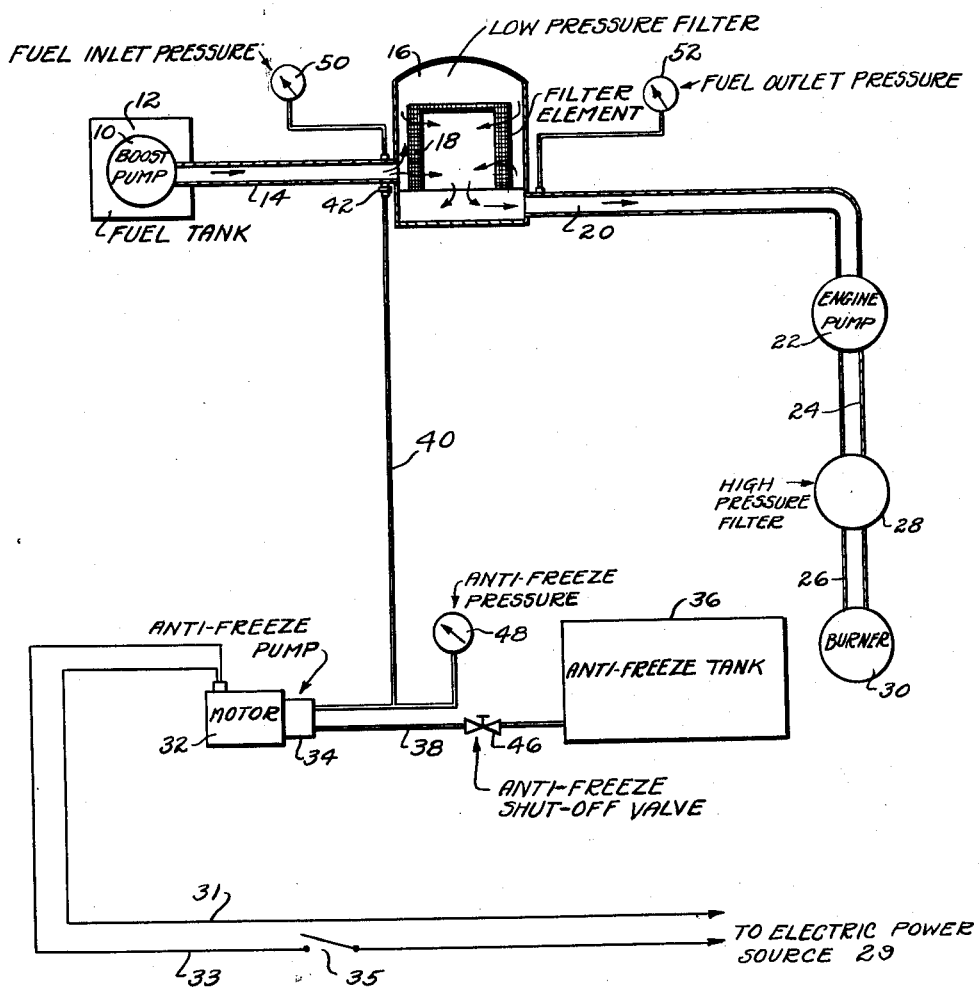
Fig. 1 is a diagrammatic representation of a fuel line and its associated equipment to which an embodiment of our invention in its simplest form is applied.

Referring more particularly to Fig. 1, a boost pump 10 submerged in the usual manner in a fuel tank 12 delivers fuel through the boost discharge pipe 14 to the inlet side of the low pressure filter 16.

Within the low pressure filter 16 the fuel passes through the porous filter element 18 into and through the outlet pipe 20 to the engine pump 22 and by way of the connecting pipes 24 and 26 to the high pressure filter 28 and burner 30 respectively.

An electric motor 32 drives the antifreeze pump 34 which draws an antifreeze fluid, preferably alcohol, from the antifreeze tank 36 by way of the tubing 38 and delivers it through tubing 40 and fitting 42 into the fuel pipe 14 adjacent the inlet side of the low pressure filter 16 where the antifreeze mixes with the fuel before it passes through the filter element 18 thereby preventing icing of the filter element or effecting de-icing thereof if that has already occurred. The motor 32 receives its electric current from a source 29 through conductors 31 and 33, upon closing of the switch 35. A valve 46 is provided to shut off antifreeze flow from the tank 36. A pressure gauge 48 indicates the antifreeze pressure. In order that the pilot may be apprised that freezing conditions are beginning to be manifest in the low pressure filter 16, two gauges 50 and 52 are connected into piping 14 and 20 respectively as close as practicable to the inlet and outlet of the filter. Icing up of the filter creates a resistance to flow through the filter element 18 which causes a drop in pressure between the gauges 50 and 52. By experience the pilot knows the degree of pressure difference which indicates that icing has become acute.

In the foregoing we have described our invention as it is shown in Fig. 1 which defines the invention in its simplest form. Further development of the invention is shown in Fig. 2.

Referring more particularly to Fig. 2, the boost pump 60, submerged as in standard practice in a sump in the bottom of a fuel tank 62, delivers fuel through pipe 64 to the upstream side of the low pressure filter 66.

Within the housing of the filter 66 is a porous filter element similar to the element 18 of Fig. 1 through which the fuel passes to the outlet side of the filter and into and through the pipe 70 to the engine pump 72 and by way of the connecting pipes 74 and 76 to the high pressure filter 78 and burner 80 respectively. A passageway which includes a bypass valve 68 connects pipes 64 and 70, whereby unfiltered fuel may continue to flow from the boost pump to the engine pump via the bypass valve should the de-icing equipment for any reason malfunction when icing conditions have become critical.

An electric motor 82 drives the antifreeze pump 84, whereby an antifreeze fluid, preferably alcohol, is drawn from the antifreeze tank 86 through the tubing 88 and delivered through tubing 90 and fitting 92 into the fuel pipe 64 adjacent the inlet side of the low pressure filter 66 where the antifreeze mixes with the fuel before it passes through the filter element, thereby preventing icing of the filter element or effecting de-icing thereof if icing has already begun.

An electric switch 94 is hydraulically connected by tubing 95 and 97 across the upstream and the downstream sides, respectively, of the low pressure filter 66, the hydraulically operated mechanism being such that electrical contacts 96 and 98 become electrically connected whenever a predetermined pressure difference exists between the upstream and the downstream sides of the filter and become electrically disconnected when the pressure difference is reduced to a predetermined lower value, the bypass valve 68 being then so constructed and adjusted that if the pressure differential operated switch 94 for any reason fails to function until the pressure difference rises slightly above the predetermined pressure difference, then the bypass valve will open and permit unfiltered fuel to pass through the pipe 70 to the engine pump. The bypass valve 68 and the pressure differential operated electric switch 94 are well known commercially available articles of manufacture and their operating mechanisms are therefore not herein described in detail.

An electric power source 100 has its minus side connected through a master switch 102 and conductor 104 to the terminal 96 of the pressure differential switch 94, and the plus side of the power source is connected to the terminal 98 of the switch 94 by conductors 106, 108 and 110 which completes a circuit which includes a warning light 112 or other appropriate signal, whereby the warning signal becomes operative whenever a predetermined pressure difference exists between the upstream and the downstream side of the low pressure filter 66 which electrically connects the contacts 96 and 98 of the pressure differential switch 94.

Upon the joining of the contacts 96 and 98 of the pressure differential switch 94 to thereby light the warning signal 112, current will also be directed from the conductor 110 through the conductor 114, through the motor 82, conductors 116 and 118 to the terminal 120 of the manual switch 122 and, if the switch 122 is closed, to the plus side of the power source 100, whereby the pump 84 will direct antifreeze fluid through tubing 90 and fitting 92 into the pipe 64 upstream of the low pressure filter 66.

In practice the pressure differential switch is so adjusted that under the worst anticipated conditions of ice in the fuel, the signal 112 and the pump 84 will be turned on from one to two minutes prior to possible bypassing of the fuel around the filter. In systems as shown in Fig. 1 which do not include the bypass valve 68, the antifreeze pump 84 should be turned on one or two minutes before a dangerous differential pressure is reached. In operating the de-icing system shown in Fig. 2, the pilot may prefer to operate with the switch 122 normally open and to close it only after the warning signal 112 has been seen for a brief period. It should, however, be closed in time to forestall opening of the bypass valve 68.

For fully automatic operation of the de-icing equipment disclosed in Fig. 2 the manual switch 122 had preferably be closed ab initio in which case the warning signal 112 will light and the antifreeze pump 84 will start simultaneously, and, when the pressure difference between the upstream and downstream sides of the low pressure filter 66 has been reduced by the melting of the ice in the filter element, operation of the warning light 112 and of the antifreeze pump 84 will be discontinued automatically and will remain inoperative until it is again needed. The frequency at which the signal appears and vanishes will indicate the severity of the icing conditions.

By using screen mesh of sufficient size for the fuel tank boost pump screens throughout an aircraft such screens are not likely to become clogged with ice under the worst fuel icing conditions encountered in the field, and therefore the filters or strainers in the main fuel line to the engine become the critical points with regard to deposition of ice with the resultant clogging and restriction of fuel flow. The advantages to be gained by injecting the antifreeze at only one point, namely, immediately upstream of the first filter or strainer in the main fuel line running to the engine, are simplicity of installation and operation and minimum weight requirements. The injection of the antifreeze fluid at this point in the fuel system results in the elimination of any ice which has accumulated not only on the first filter or strainer but at any other point downstream.

The amount of antifreeze required to eliminate ice, and thus provide safe aircraft operation under the worst anticipated conditions is extremely small, particularly when compared to any method such as premixing the entire fuel load with a percentage of alcohol or other ice preventive compound. Moreover, antifreeze is consumed only when icing conditions reach the danger point, adequate warning of such conditions being provided.

Having described an embodiment of our invention, we claim:

1. Apparatus for de-icing a filter in the fuel line of an aircraft engine which comprises an electric power source, an electric signal associated therewith, an electric motor operated antifreeze pump, a pressure differential switch operatively connected to said signal and said pump having means closable to direct an electric current from said power source through said signal and from said power source through said motor to operate said signal and said motor, said pressure differential switch having two hydraulic means connected to the fuel line the one hydraulic means connected to the upstream and the other hydraulic means to the downstream sides of the filter, the switch being adapted, when the pressure upstream of the filter exceeds the pressure downstream of the filter by a predetermined amount to close to operate said electric signal and said electric motor operated antifreeze pump, an antifreeze tank associated with said pump, means hydraulically connecting said tank to said pump and said pump to the upstream side of said filter.

2. The apparatus of claim 1 with a second electric switch interposed between said pressure differential switch and said pump openable manually to break the electric circuit through the electric motor of the electric motor operated pump without breaking the circuit through said signal.

3. The apparatus of claim 1 with a bypass passage connecting the upstream and downstream sides of the filter, and with a bypass valve therein openable for downstream flow by a predetermined excess in pressure at the upstream side of the filter over the downstream side.

4. Apparatus for deicing a filter in the fuel line of an internal combustion engine comprising, power driven means to inject an antifreeze liquid in the fuel line at the upstream side of the filter, a pressure differential switch, conduit means connected from the fuel line upstream of the filter to said switch, and also from the fuel line downstream of the filter to said switch, and an electric circuit including a power source and said switch to energize said power driven means when the pressure in said fuel line downstream of the filter is reduced by icing below the pressure in said fuel line upstream of the filter by a predetermined amount.

5. Apparatus for deicing a filter in the fuel line of an internal combustion engine comprising fuel pressure sensing means operatively associated with the fuel line at the upstream and downstream sides of the filter respectively responsive to the fuel pressure therein, pump means associated with the fuel line at the upstream side of the filter and connected to means containing anti-freeze, and means connected to said pump means and operable upon the sensing of a predetermined pressure differential by the fuel pressure sensing means to activate the pump means to inject anti-freeze into the fuel line at the upstream side of the filter.

6. Apparatus for deicing a filter in the fuel line of an aircraft engine comprising a source of electric power, a switch means associated therewith and hydraulically connected to the fuel line at the upstream and downstream sides of the filter respectively responsive to a predetermined differential fuel pressure therein, signal means operatively connected to said switch and actuable by the predetermined differential fuel pressure in the fuel line at the upstream and downstream sides of the filter, a source of anti-freeze, means connecting said source of anti-freeze and the fuel line upstream of the filter and operable in response to said predetermined pressure differential to inject anti-freeze into the fuel line at the upstream side of the filter.

ROBERT G. DUNN.
ROBERT F. HEISER.

References Cited in the file of this patent

UNITED STATES PATENTS

| Number | Name | Date |
|---|---|---|
| 1,054,702 | Maranville | Mar. 4, 1913 |
| 2,080,488 | Kimball | May 18, 1937 |
| 2,140,626 | Hewitt | Dec. 20, 1938 |
| 2,172,882 | Watkins | Sept. 12, 1939 |
| 2,229,498 | Farmer | Jan. 21, 1941 |
| 2,302,418 | Cameron | Nov. 17, 1942 |
| 2,366,830 | Cannon et al. | Jan. 9, 1945 |